US 7,006,941 B2

(12) United States Patent
Wettstein et al.

(10) Patent No.: US 7,006,941 B2
(45) Date of Patent: Feb. 28, 2006

(54) METHODS AND DEVICES FOR THE RELEVANCY TESTING OF AN IDENTIFIER

(75) Inventors: Horst Wettstein, Karlsruhe (DE); Jochen Rein, Renningen-Malmsheim (DE); Tobias Pongs, Stuttgart (DE)

(73) Assignee: Vector Informatik GmbH, Stuttgart (DE)

( * ) Notice: Subject to any disclaimer, the term of this patent is extended or adjusted under 35 U.S.C. 154(b) by 937 days.

(21) Appl. No.: 10/036,456

(22) Filed: Jan. 7, 2002

(65) Prior Publication Data

US 2002/0095520 A1    Jul. 18, 2002

(30) Foreign Application Priority Data

Jan. 12, 2001   (EP)   ................................. 01100723

(51) Int. Cl.
    *G06F 19/00* (2006.01)
    *G06F 15/16* (2006.01)
(52) U.S. Cl. .................. 702/122; 702/62; 709/253
(58) Field of Classification Search .............. 702/62, 702/108, 122, 188; 709/204, 206, 207, 217, 709/225, 253; 715/503, 745; 710/305
    See application file for complete search history.

(56) References Cited

U.S. PATENT DOCUMENTS 5,444,643 A      8/1995  Häussler et al.
5,729,755 A *    3/1998  Turski ........................ 710/305

FOREIGN PATENT DOCUMENTS

DE           41 29 412 A1    3/1993

OTHER PUBLICATIONS

Lars-Berno Fredriksson: "A CAN Kingdom" INTERNET, Online!, Rev. 3.01, Mar. 1997(, XP002168443.
Bob Jenkins: "Hash Funktions", Dr. Dobb's Journal, CD-ROMI, Sep. 1997, XP002168979.
National Semiconductor: "Replacing dedicated protocol controllers with code efficient and configurable microcontroller-low speed CAN network applications" Online! 1997, INTERNET XP002157760.
Infinon Technologies: "The On-Chip CAN Interface", INTERNET, Online! Sep. 1999, XP00216844.
Edwin T. Floyd: "An Existential Dictionary Superimposed coding packs a lot of information into small place", Dr. Dobb's Journal, CD-ROMI 1990, XP002168980.

* cited by examiner

*Primary Examiner*—Bryan Bui
*Assistant Examiner*—John Le
(74) *Attorney, Agent, or Firm*—Browdy and Neimark, PLLC (57) ABSTRACT

A test method for relevancy testing of an identifier able to be transmitted to a communication device by way of a communication network in a message, a test module therefor and a generating module for building a relevancy table provided for the testy method. In the test method a first position in the relevancy table is sought for the identifier on the basis of a calculating rule applied to the identifier or a on the basis of a second position alternative to the latter using a move-on rule applied to the identifier in a case of conflict, in which the first position is not available until an available position is found. The identifier is designated as being relevant, when at the first or the second position the identifier or a value associated with it is entered or as being irrelevant, when at the first or the second position a non-use marker is entered.

20 Claims, 3 Drawing Sheets

| IDG | w | p | inc | P0 | P1 | P2 | P3 | P4 | P5 | P6 | P7 | P8 | P9 | P10 | ST |
|---|---|---|---|---|---|---|---|---|---|---|---|---|---|---|---|
| I5 | 5 | 5 | 6 | | | | | | 5 | | | | | | 1 |
| I1 | 1 | 1 | 2 | | 1 | | | | 5 | | | | | | 1 |
| I8 | 8 | 8 | 9 | | 1 | | | | 5 | | | 8 | | | 1 |
| I89 | 89 | 1 | 10 | 89 | 1 | | | | 5 | | | 8 | | | 2 |
| I16 | 16 | 5 | 7 | 89 | 1 | | | 16 | 5 | | | 8 | | | 4 |

Fig. 5           22

| IDG | w | p | inc | P0 | P1 | P2 | P3 | P4 | P5 | P6 | P7 | P8 | P9 | P10 | ST |
|---|---|---|---|---|---|---|---|---|---|---|---|---|---|---|---|
| I5 | 5 | 5 | 6 | | | | | | 5 | | | | | | 3 |
| I1 | 1 | 1 | 2 | | 1 | | | | 5 | | | | | | 1 |
| I8 | 8 | 8 | 9 | | 1 | | | | 5 | | | 8 | | | 1 |
| I89 | 89 | 1 | 10 | 89 | 1 | | | | 5 | | | 8 | | | 2 |
| I16 | 16 | 5 | 7 | 89 | 1 | | | 16 | 5 | | | 8 | | | 1 |

Fig. 6           22b

| IDG | wt | p | inc | P0 | P1 | P2 | P3 | P4 | P5 | P6 | P7 | P8 | P9 | P10 | ST |
|---|---|---|---|---|---|---|---|---|---|---|---|---|---|---|---|
| I5 | 9 | 9 | 10 | | | | | | | | | | 5 | | 1 |
| I1 | 5 | 5 | 6 | | | | | | 1 | | | | 5 | | 1 |
| I8 | 12 | 1 | 3 | | 8 | | | | 1 | | | | 5 | | 1 |
| I89 | 93 | 5 | 4 | | 8 | 89 | | | 1 | | | | 5 | | 3 |
| I16 | 20 | 9 | 1 | | 8 | 89 | | 16 | | | | | 5 | 16 | 2 |

Fig. 7           22c

| IDG | wt | p | inc | P0 | P1 | P2 | P3 | P4 | P5 | P6 | P7 | P8 | P9 | P10 | ST |
|---|---|---|---|---|---|---|---|---|---|---|---|---|---|---|---|
| I5 | 9 | 9 | 10 | | | | | | | | | | 5 | | 1 |
| I1 | 5 | 5 | 6 | | | | | | 1 | | | | 5 | | 2 |
| I8 | 12 | 1 | 3 | | 8 | | | | 1 | | | | 5 | | 1 |
| I89 | 93 | 5 | 4 | 1 | 8 | | | | 89 | | | | 5 | | 2 |
| I16 | 20 | 9 | 1 | 1 | 8 | | | | 89 | | | | 5 | 16 | 2 |

Fig. 8           22d

METHODS AND DEVICES FOR THE RELEVANCY TESTING OF AN IDENTIFIER

BACKGROUND OF THE INVENTION

The invention relates to a method for testing the relevancy of an identifier which may be transmitted to a communication means by way of network in a massage, a test module therefor and furthermore a generating method for the formation of a relevancy table provided for relevancy testing of identifiers associated with an identifier group and a generating module therefor.

THE PRIOR ART

In communication networks messages are frequently not systematically sent from one source communication means to one target communication but rather transmitted in a so-called broadcast method to numerous target communication means. The respective target communication means must then on the basis of an identifier, comprised in a respective message, for example of a target address of the message or of an identifier for a content of the message, decide whether the message is relevant for it. Typical examples of this are bus systems in which the bus system participants all receive messages transmitted by the bus.

If for a target communication means solely one single identifier is relevant, relevancy testing of the identifier still may be implemented using a simple comparison operation comparatively easily. In the case of a plurality of identifiers relevant for the target the ascertainment of whether a respectively received identifier is relevant for the communication means, is substantially more difficult. For instance, an identifier to be tested may be tested with reference to a list to be checked linearly of relevant identifiers.

In the case of a somewhat improved method a halving technique is for instance employed for such a list. It is also conceivable that unlike irrelevant identifiers relevant ones are identified by an unambiguous, common feature, for instance a predetermined bit pattern, so that a simple comparison test would be possible, for example by masking the bit pattern.

If a communication means, for instance a bus participant on a CAN bus (controller area network) bus receives messages having numerous different identifiers relevant respectively for the communication means, the above mentioned test methods will be cumbersome and slow. On the communication means side there must for this purpose be a substantial and expensive processor power.

SHORT SUMMARY OF THE INVENTION

One object of the invention is to provide methods and devices rendering possible efficient relevancy testing of identifiers, which can be transmitted by way of a communication network in a message.

In order to achieve these and/or other objects appearing from the present specification, claims and drawings, in the present invention a test method is provided for the relevancy testing of an identifier, which is able to be transmitted to a communication means by way of a communication network in a message, comprising the steps of:

finding a first position in a relevancy table for the identifier on the basis of a calculating rule applied for the identifier, seeking at least one second position alternative to the first position for the identifier in the relevancy table on the basis of a move-on rule applied to the identifier in the case of conflict where the first position is not available, until an available position, not associated with some other identifier is found in the relevancy table, designation of the identifier as being relevant, if the identifier, or a value associated with it, is entered at the first or the at least one second position, and designation of the identifier as being irrelevant, if at the first position or the at least one second position a non-use marker is entered.

In order to achieve the object appearing from the present specification, claims and drawings, in the present invention furthermore a testing module is provided for relevancy testing an identifier able to be transmitted in a message by a communication network, having test means for the performance of the above mentioned steps.

The above mentioned test method and furthermore the test module essentially serve to render it possible for a communication means, which receives an identifier as part of message, to implement a rapid relevancy test on the respective identifier.

In order to build the necessary relevancy table and accordingly to attain the object of the invention the following are furthermore provided: a generating method for building relevancy table (provided for a communication means) for relevancy testing of identifiers associated with an identifier group, said identifiers being provided for identifying messages relevant for the communication means and able to be transmitted by a communication network, in the case of which positions provided in the relevancy table and not associated with any identifier in the identifier group are marked with a non-use marker and in the case of which for each identifier of the identifier group the following positioning steps are performed:

finding a first position in the relevancy table for the respective identifier using a calculating rule applied to the identifier, seeking at least one second position for the identifier in the relevancy table on the basis of a move-on rule applied to the identifier in the case of conflict, in the case of which the first position is not available, until an available position, not associated with any other identifier in the identifier group is found in the relevancy table, and entry of the identifier or of a value associated with it at the respectively found first or at least one second position, and a generating module for building a relevancy table (provided for a communication means) for relevancy testing of identifiers associated with an identifier group, and which are provided for identifying messages relevant for the communication means and able to be transmitted by way of a communication network, with marking means for marking positions provided in the relevancy table and not associated with an identifier of the identifier group and with positioning means for the performance of the above mentioned positioning steps for each identifier of the identifier group.

Accordingly during generation of the relevancy table the same method steps are performed in principle as during testing an identifier on the basis of the relevancy table so generated and more particularly the same calculating rule and the same move-on rule are employed so that there is common inventive concept. The only difference is basically that for the generation of the relevancy table an identifier is entered at a specifically allotted position and relevancy testing serves to see whether an identifier to be tested is possibly entered at this position already.

A significant basic concept of the invention is the application of the inherently known hash method to an optimized relevancy testing of identifiers with which messages relevant for the communication means are marked.

Unlike the known methods the hash method is substantially quicker and more efficient. It is accordingly possible for extensive groups of identifier relevant for a communication means to be reliably tested in a relatively short time.

For further optimizing the relevancy testing attention is called to the features recited in the claims and described in the specification.

It is convenient to find a maximum number of working steps even during building the relevancy table for the identifiers of the identifier group relevant for the communication means and for example to hold such number ready for the communication means and/or the test module, such number being maximally necessary during application of the calculating rule and/or the move/on rule to the identifiers of the identifier group so that the maximum number may be employed as a discontinuance criterion during the relevancy testing of an identifier not contained in the identifier group.

During relevancy testing it is then an advantage to have such a provision that the calculating rule and/or the move-on rule for the identifier to be tested is utilized for a predetermined maximum number of working steps and for the marker to be assumed to be irrelevant, if the respective position found after the predetermined maximum number of working steps in the relevancy table is allotted to a different identifier than the identifier to be tested.

Owing to the optimized design of the relevancy table the efficiency of relevancy testing may be substantially increased and more especially it is possible for the number of necessary working steps, that is to say the application of the calculating rule and/or of the move-on rule, to be reduced for instance in the case of individual identifiers or on average in the case of all identifiers of an identifier group.

Therefore in the case of method there is a provision such that for at least one identifier in the identifier group a position in the relevancy table is so associated in an optimized manner that the number of the working steps necessary for finding the position is low in the case of which more particularly the calculating rule and/or move-on rule is applied.

The at least one identifier positioned in the relevancy table in an optimum manner is preferably selected in accordance with a predetermined criterion and more particularly in accordance with an expected rate of transmission or in accordance with a priority of the message respectively contained in it. It is possible as well for a single identifier, as for example an identifier which is particularly frequently contained in messages, to be selected in accordance with a first criterion and for a number of other identifiers, for instance particularly significant identifiers to be dealt with applying a priority, to be selected in accordance with a second criterion.

A convenient method of optimizing in the generating method of the invention is such that the number of the positions able to be associated with the identifiers of the identifier group is increased or reduced. Accordingly more especially the number, which is required on average for each identifier of the identifier group, of test steps may be reduced.

However, for optimizing the relevancy table an important aim is make it as small as possible for minimizing the memory capacity requirement in the communication means so that as many relevancy table positions as possible are associated with an identifier of an identifier group.

For this purpose the generating method is preferably so improved upon that the identifiers of the identifier group are transformed as part of the application of the calculating rule to a representation sub-set, on the basis of which positions in the relevancy table may be associated with the respective identifiers.

The representation sub-set is in this case preferably so generated that the positions associated with the respective identifiers are arranged evenly and avoiding conflict in the relevancy table. The calculating rule is accordingly so selected and/or modified that cluster formation, is prevented, in which several identifiers would compete with or conflict at the same position owing to an unmodified calculating rule. Owing to the modified calculating rule these identifiers are respectively given separate positions For modification of the calculating rule several, single methods or methods able to be employed in any desired combination are suitable. For instance, a numerical value, which is more particularly determined as a random number is added to or subtracted from each identifier in the identifier group. Furthermore, each identifier could be multiplied with a multiplier or processed in logical operations, for example using logical "AND", logical "OR" or "shift".

It will be clear that after that a sort of "optimum" calculating rule found during the course of optimizing the relevancy table will be utilized by the test method and the test module as well.

A further method of optimizing, which may be readily combined with the above mentioned ways of optimizing, is such that the order is varied, in accordance with which the identifiers of the identifier group respectively have positions in the relevancy table associated with them.

It is in this manner that in certain cases it is not even necessary for the calculating rule to be modified in order to reduce the number of conflicts in the association of positions in the relevancy table with identifiers. Furthermore, it is possible for example for an identifier, which is to be frequently tested, or an identifier with a high priority, to be preferentially entered in the relevancy table.

A particular advantage of the optimized relevancy table is to be seen in the fact that same may be produced "offline" using a generating module. For example, a high performance workstation or a computer network with a high processor capacity may be provided. Moreover, it is essentially irrelevant how much time is necessary for optimizing the relevancy table. Thus the above mentioned optimizing step may be readily tried out in different combinations by the generating module in order to generate a relevancy table with an optimum small size, in the case of which for relevancy testing of an identifier only a few working steps are necessary.

The optimized relevancy table is made available for the test module, which for example is integrated in a receive component of a communication means. For instance, the relevancy table may be burned in a ROM. On the test module side and therefore on the communication means side only very little processor capacity is necessary, owing to the already optimized relevancy table, for the relevancy testing of an identifier.

The following advantageous modifications of the invention relate both to the test method and the test module and also to the generating method and the generating module.

As a marker of non-use it is possible for different marker types to be utilized. It is an advantage for a void marker to be provided as a non-use marker, such void marker being extremely readily detected by the test module. It is possible also for the non-use marker to be formed by an invalid value not associated with an identifier comprised in the identifier group, as for example associated with a value which is substantially larger than a value permitted for a valid identifier.

In the case of application of the calculating rule and/or the move-on rule it is preferred for an indicator to be found pointing to the first and/or the respectively at least one second position in the relevancy table, this being performed by dividing the identifier or, respectively, a move-on value derived from same on the basis of division by a prime number, which corresponds to for identifiers. It is in this manner that the position to be associated with an identifier respectively in accordance with the calculating rule or, respectively, the move-on rule may be quickly found.

In the case of a particularly preferred mode there is a provision such that the indicator is set as a whole number remainder of the division of the marker a value by a prime number. Instead of division by the prime number repeated subtraction of the prime number from the respective identifier may be provided for.

Owing to the move-on rule two identifiers are associated with different positions, which owing to the calculating rule would otherwise be associated with or assigned to the same position in the relevancy table. In this case it is an advantage that the move-on rule essentially comprises the calculating rule. For this purpose for the application of the move-on rule for example firstly a move-on value is formed from an identifier, and such value is added to a current index at a position in the relevancy table. On the basis of this sum and using the calculating rule then a position for the identifier in the relevancy table is found. It will be clear that the same move-on rule must be employed in the generating method and in the test method.

The identifier can in principle be any suitable value an indicator or the like in a message intended for the communication means,. It is convenient for the identifier to be contained in an address data item, more particularly in a target address, of a respective message or in a content identifier for a content of the respective message. In this case the identifier can constitute the target address or, respectively, the content identifier or only be a part of same. A fraction to be respectively tested and constituting an identifier of a target address or of a content identifier may for example be found by masking or shifting the respective target address or, respectively, of the content identifier.

In principle it is possible for any suitable communication network to be provided, even one in which end-to-end communicate is provided. In the case of such a communication network as well a plurality of messages are possibly transmitted to communication means, which are to undergo relevancy testing and in which identifiers, suitable for this purpose, are provided. To take an example a message could be relevant in a predetermined operational state of the communication means but irrelevant in some other operational condition. However, there is a provision in the preferred form of the invention such that as a communication network a broadcast network is provided, in the case of which the communication means receiving the respective messages are compelled to perform relevancy testing of the messages, that is to say to perform filtering out of message which are respectively irrelevant for them.

Typical examples of broadcast networks are bus systems and more especially a Controller Area Network (CAN) bus system or a Local Interconnect Network (LIN) bus system as a communication network. CAN and LIN bus systems are more particularly utilized in automation technology or for motor vehicles. It is more particularly in the case of motor vehicles that the increasing number of electrical components, which must be controlled and monitored, means an increasing message traffic load on the respective bus systems. The bus participants then receive a large number of messages which are irrelevant for them, which can be rapidly removed using relevancy testing in accordance with the invention while only needling little computing capacity. As an example for a control component for a tail light messages relating to a car radio or a navigation system are unimportant.

Further advantageous developments and convenient forms of the invention will be understood from the following detailed descriptive disclosure of one embodiment thereof in conjunction with the accompanying drawings.

DETAILED ACCOUNT OF WORKING EMBODIMENT OF THE INVENTION

Figure 1:
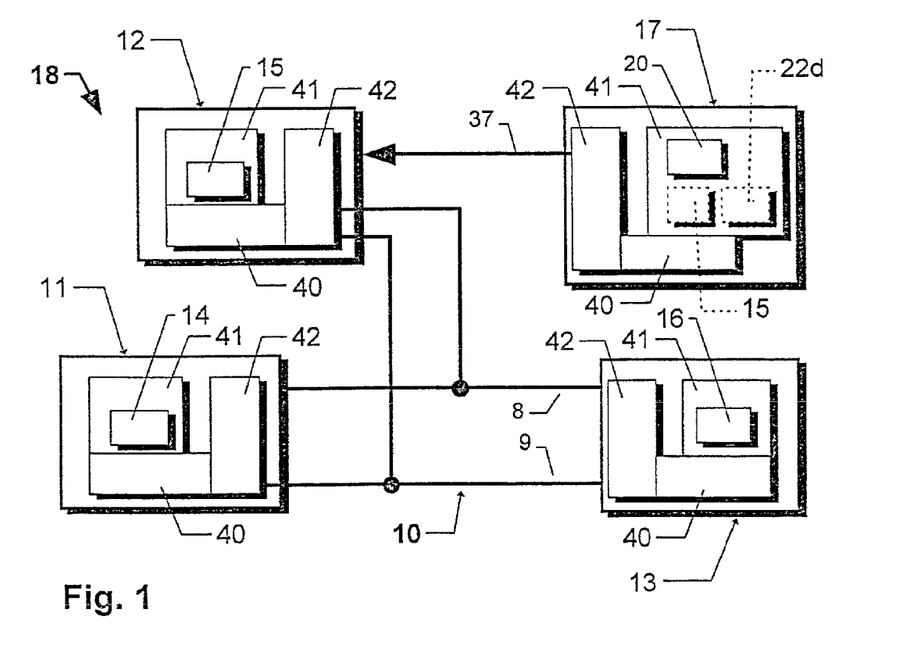
FIG. 1 diagrammatically shows a bus 10 with communication means 11, 12 and 13, which comprise test modules 14, 15 and 16, and furthermore a developing tool 17 with a generating module 20.

FIG. 1 shows a bus 10 constituting a communication network which is here a CAN bus or a LIN bus, with its connected communication means 11, 12 and 13, which constitute bus participants on the bus 10 and represent examples of further communication means, not illustrated. The bus 10 is arranged in a motor vehicle 18 and includes bus lines 8 and 9, one bus line 8 and 9 being for example constituted by ground common to the communication means 11, 12 and 13.

The communication means 11 is for example a central control device for the control of local component group controls, which for example are constituted by the communication means 12 and 13 and for example serve for the control of a tail light component group or distance measuring means on the motor vehicle.

The communication means 11, 12 and 13 communicate by way of the bus 10 with each other, each message transmitted by way of the bus being received by all communication means 11, 12 and 13 connected with the bus 10. When the communication means 11 for example transmits a message, as for instance the message 19 illustrated in FIG. 2, to the communication means 12, such message will also be received by the communication means 13. While the message 19 is relevant for the communication means 12, it is rejected by the communication means 13 as being irrelevant.

Figure 2:
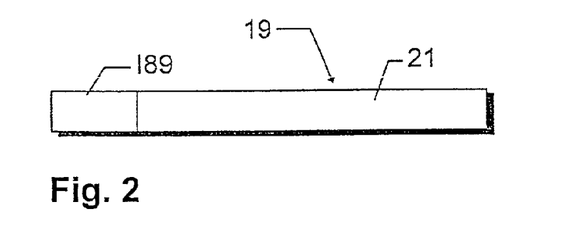
FIG. 2 shows a message 19 transmitted on the bus 10.

The message 19 comprises data and an identifier ID, which for example is constituted by a target address of the message 19 or an identifier for its content or is comprised in the target address or, respectively, in the content identifier of the message 19. The identifier I89 has a value (w) equal to 89 and constitutes a component of an identifier group IDG, comprising further identifiers I5, I1, I8 and I16 with values (w) of 5, 1, 8 and 16. The identifiers I5, I1, I8, I89 and I16 mark message relevant for the means 12, the identifier I89 marking for example the message 19. The identifier group IDG in the present case is structured as a single dimensional field or array.

For the relevancy testing of identifiers the a test module 15 is provided in the communication means 12, which on the basis of a relevancy table 22; 22b; 22c and 22d tests identifiers comprised in a message and which in the present case is a program module implemented by the communication means 12. However, before the manner of functioning of the test module 15 and of test modules 14 and 16 provided in the communication means 11 and 13 and functioning like the test module is described in more detail, the generation of the relevancy table 22; 22b; 22c and 22d by a relevancy table will be described, which in the present case is in the form of a program module implemented by a development tool 17.

The generating module 20 associates the identifier I5, I1, I8, I89 and I16 with positions P0 to P10 in the relevancy table 22; 22b; 22c and 22d. In this respect the generating module 20 applies the following calculating rule $$p = w \bmod d \quad (1)$$

to the values 5, 1, 8, 89 and 16 of the identifiers I5, I1, I89 and I16, p being an index on one of the positions P0 through P10 of the relevancy table 22; 22b; 22c and 22d. The index P is formed as a whole number remainder in a modulo operation with a divisor d on the respective w value. In this case the divisor d is a prime number and is equal to the number of positions P0 through P10. In the present case d is equal to 11.

It is convenient for the value of the divisor d and accordingly the number of positions in a table to be equal to about twice the number of the identifiers to be associated with a given relevancy table. In principle the divisor may however be found in a different manner. All identifiers in an identifier group must be able to be associated with one respective position in the respective relevancy table.

Figure 3:
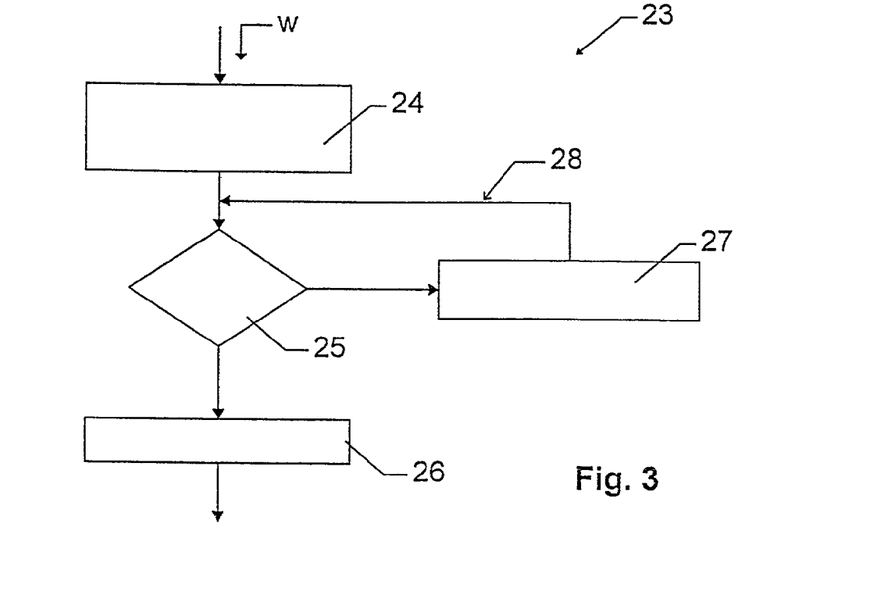
FIG. 3 is a flow chart 23 of the generating module 20 as in FIG. 1.
Figure 5:
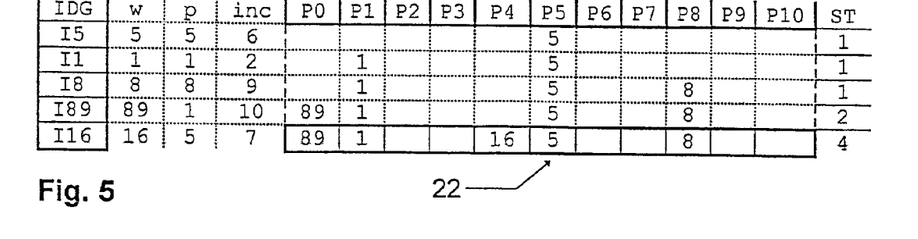
FIGS. 5 to 8 show relevancy tables 22, 22b, 22c and 22d produced by the generating module 20 of FIG. 3.

During the association of the identifiers I5, I1, I8, I89 and I16 with the positions P0 through P10, the generating module 20 performs the method 23 illustrated in FIG. 3, in the case of which the relevancy table 22 depicted in FIG. 5 is produced. The method 23 is performed for each of the identifiers I5, I1, I8, I89 and I16 of the identifier group IDG.

In a step, which is not illustrated, the positions P0 through P10 are firstly provided with a non-use marker, a void marker being provided in the present case.

In a step 24 the calculating rule (1) is applied to the respective w value of an identifier I5, I1, I8, I89 and I16. In this case for the identifiers I5, I1 and I8 the associations with or assignments to the positions P5, P1 and P8 are found. In a test step 25 an examination is in each case made to see whether the positions P5, P1 and P8 are not already associated with an identifier. This is in not so in any case, i. e. in the present case a void marker is entered, if the identifiers I5, I1 and I8 are to be associated with positions P5, P1 and P8 so that in one step 26 the generating module 20 can enter the values (w) of 5, 1 and 8 of the identifiers I5, I1 and I8 at the positions P5, P1 and P8.

During the application of the calculating rule (1) in the step 24 to the w value 89 of the identifier I89 however in the test step 25 it is found that the identifier I89 is to be associated with the position P1 already occupied by the identifier I1. Therefore following the test step 25 it is necessary to see that in a move-on step 27 an alternative position is found in the relevancy table 22 and to return in a return branch 28 to the test step 25 in order to check to see whether respectively found position is available. This does apply for the position P0 found for the identifier I89.

In the move-on step 27 the following calculating rules (2a) and (2b), which constitute a move-on rule (2), are applied:

$$inc = (w \bmod (d-1)) + 1 \quad (2a)$$

$$p_{n+1} = (p_n + inc) \bmod d \quad (2b)$$

In the calculating rule (2a), which may be performed in step 25, a move-on value inc is found from the respective value w of an identifier. The move-on value inc is added to the index pn at the position already occupied by an identifier. In the specific case the index $p_n=1$ for the identifier I89 applies for the position P1 already occupied by the identifier I1 and in accordance with the calculating rule (2a) the move-on value inc=10 applies. After application of the calculating rule (2b) to the sum $$p_n + inc = 1 + 10 = 11$$

the result is then the index pn+1=0 pointing to the position P0. It will be seen that in the present case the calculating rules (1) and (2b) are essentially the same but with the difference that in accordance with the calculating rule (1) the modulo operation with the divisor d is applied directly to the value w of an identifier, whereas in accordance with the calculating rule (2b) the modulo operation with the divisor is performed on the sum of the move-on value inc and the index pn is applied on the currently found position already occupied by an identifier.

For the identifier I16 the move-on rule (2) must be applied three times in all, since after the application of the calculating rule (1) the position P5 occupied by the identifier I5 and following this in the case of a triple application of the move-on rule (2) the positions P1, P8 (occupied by the identifiers I1 and I8) and only after this the position P4 are found. All in all for finding the position P4 four working steps ST are necessary, something which in FIG. 5 is noted in a column marked "ST". For the identifiers I5, I1 and I8 on the contrary only one working step ST is necessary, namely the application of the calculating rule (1). This is advantageous in the later described relevancy testing of the identifiers I5, I1 and I8.

The relevancy table 22 produced in the method 23 is illustrated in FIG. 5, and the individual method steps of the method 23 are indicated in columns marked as IDG, w, p, inc and ST and the lines marked I5, I1, I8 and I89. The relevancy testing table 22 and furthermore in principle the relevancy tables 22b, 22c and 22d depicted in FIGS. 6 through 8 may for example also be defined as numerical series only, in the present case with the values 89, 1, 255, 255, 16, 5, 255, 255, 8, 255 and 255 for instance, "255" meaning a non-use marker for a position in the sequence and masking an invalid identifier. It is also possible for further lines and/or columns to be provided in the relevancy table 22; 22b: 22c and 22d, in which data necessary for further processing of the respective message are present.

Figure 4:
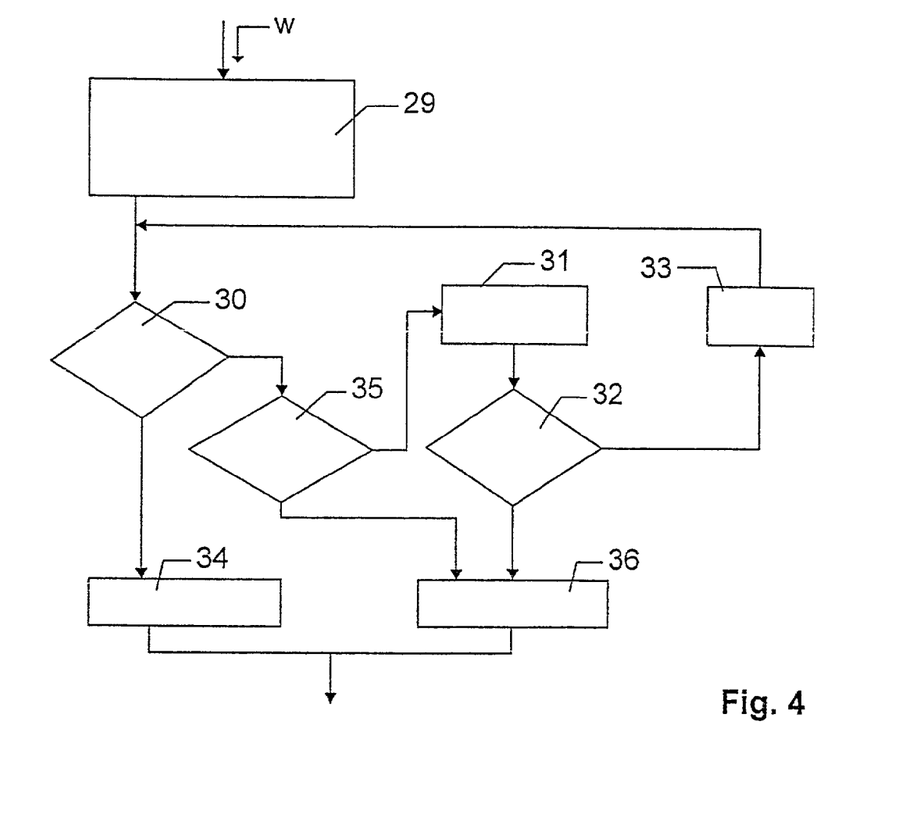
FIG. 4 is a flow chart for the test modules 14, 15 and 16 in FIG. 1.

In the following relevancy testing as represented in FIG. 4 for the identifier I89 will be explained on the basis of 22 using the test module 15.

In one step 29 the calculating rule (1) is applied to the w value 89 of the identifier I89, the index of the position P1 being found. Furthermore a step counter 2 is initialized at for instance s=1, which serves to limit the number of working steps in the relevancy table 22.

In principle a maximum number smax could be set for the step counter by the number of the positions P0 through P10 in the relevancy table 22. In the present case however maximum number smax is defined as the maximum number of working steps given in the column ST; in the relevancy table 22 the value of smax is 4.

In a test step 30 following the step 29 a test is made to see whether the value entered at the position P1 is the same as the w value 89 of the identifier I89. This is no so, since the position P1 is associated with the identifier I1 and accordingly the w value of 1 is entered there. After this in a test step 35 a test is made to see if the position P1 has a non-use marker entered in it, this being in the present case a void marker. This is not the case either, since 1 as a w value is entered at the position P1.

Therefore in a further step 31 the count s of the step counter is firstly incremented by 1 and in a following test step 32 a test is made to see whether the step count s has already exceeded the maximum number of smax. In the current run the step count s is at 2, that is to say smaller than the maximum number smax of 4.

Accordingly following the test step 32 in a move-on step 33 an alternative position is found for the identifier I89 in the relevancy table 22. For this purpose, as already explained with reference to the method 23, the calculating rules (2a) and (2b) of the move-on rule (2) are applied to the index pn=1 of the position pi and accordingly the position P0 is found. In the move-on steps 23 and 27 the same operations are performed in principle.

After the move-on step 33 in the test step 30 a test is made to see whether the value entered at the position P0 is the same as the w value 89 of the identifier I89. Since this is now the case, in an output step 34 an output is produced indicating that the identifier I89 is an identifier relevant for the communication means 12 and accordingly the message 19 is a relevant message.

If the w value of the identifier I89 were not 89 but for example 2, the application of the calculating rule (1) in the step 29 would result in an association with the position 2. The result in the test step 30 would admittedly be that the w value of 2 is not entered at P2, but however then in the following test step 35 it would be found that a non-use marker is entered at the position P2. Therefore in a following output step 36 an output would be produced to indicate that the identifier I89 with the w value of 2 is an identifier which is irrelevant for the communication means 12 and therefore the message 19 is an irrelevant message. The same result of "irrelevant", that is to say the output step 36, will be arrived in the test step 32, if after more than the maximum number of working steps (smax) of 4 neither a position with a non-use marker nor a position is found, at which the value of the respective identifier to be tested is entered. Without testing the maximum number (smax) of 4 working steps in the test step 32 in the relevancy table 22 in the worst case 5 working steps will be necessary for the relevancy testing of an identifier, since the identifier group IDG comprises 5 identifier in all, which are respectively associated with one of the positions P0 through P10 in the relevancy table 22.

It will be clear that the test method may also be designed in some other embodiment, as for example with a different series, not illustrated, of steps. For instance the test steps 30, 32 and 35 could be performed in any desired order one after the other.

The fact that not more than 4 working steps are needed involves an improvement in the relevancy testing in order to find the result of "irrelevant" in the case of an identifier to be tested. Furthermore there may be a case in which for example the identifiers I5, I1 and I8 are extremely frequently received by the communication means 12 so that the structure of the relevancy table 22, in which for the relevancy testing of the identifiers I5, I1 and I8 respectively only one working step is necessary, is well suited for the communication means 12.

However, the relevancy table 22 may be so optimized that less working steps are required in order to come to the result of "relevant" or "irrelevant" in the case of an identifier to be tested, the test routine being terminated in the present case in the test step 32 when there is an irrelevant identifier.

The generating module 20 optimizes the relevancy table 22 following criteria, which are preset by a user or for instance automatically. A preferred criterion is for example that the number of the working steps to be performed on average in relevancy testing is reduced. For the relevancy table 22 it is possible for example to stipulate that the maximum number (smax) of working steps is equal to 2.

It has turned out to be advantageous firstly to enlarge the respective relevancy table so that conflicts between several identifiers at a relevancy table position are prevented and then to apply one or more of the following optimization routines. However, in order to present a clear picture in the present case there is to be no increase in the size of the relevancy table 22 here.

In accordance with one optimization routine the identifiers I5, I1, I8, I89 and I16 of the identifier group IDG are entered in a different order in the relevancy table 22 and/or the associations of identifiers conflicting on association at one position are changed over. In this particular context in the relevancy table 22 the associations of the identifiers I5 and I16 with the positions P5 and P4 are problematical which are caused by the preferred putting in place of the identifier I5.

Figure 6:
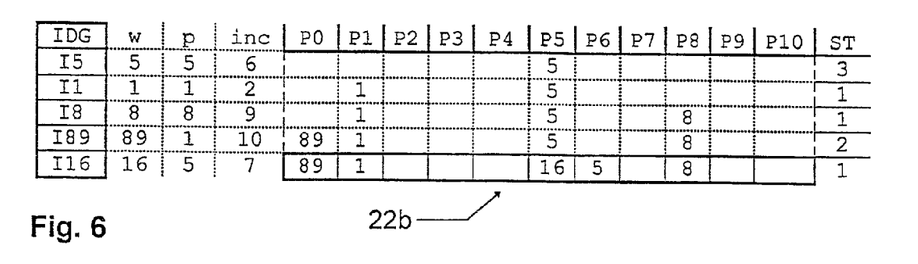

Although initially, for such optimization, in the modified relevancy table 22b depicted in FIG. 6 the identifier I5 is associated with the position P5, then however the identifier I16 has been associated with the position P5 and for the identifier I5 the substitute position P6 has been found for the identifier I5 by the application of the routine 23. It is also possible for the order of the identifiers I5 and I16 in the identifier group IDG to be changed over prior to the association with the positions P0 to P10 in the relevancy table 22b.

In the column ST it will be seen that the maximum number (smax) is 3, i. e. 3 working steps are required in relevancy testing.

Figure 7:
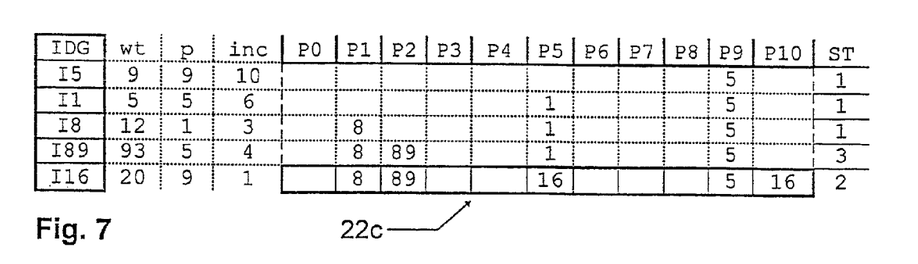

A further optimization routine or method is employed in the relevancy table 22c illustrated in FIG. 7. Here the w values 5, 1, 8, 89 and 16 of the identifiers I5, I1, I89, I16 are shown on transformed values (wt) of 9, 5, 12, 93 and 20. The transformation formula (3) for this is (in the case of the example of FIG. 7):

$$wt = w + z \quad (3)$$

In the present case a numerical value (z) of 4 is entered. In building the relevancy table 22c then instead of the w values the transformed wt values given in a column denoted wt are employed in the calculating rule (1) and the calculating rule (2a) of the move-on rule (2). As 22b in FIG. 6 there is a maximum number (smax) of 3.

For the numerical value z in a optimizing routine it is advantageous to try out all values lying between 0 and d−1 and the maximum number smax is respectively found. Thus an optimum number value z can be found. It is also possible to utilize some other transformation formula. For instance, the w value could be multiplied by z: f. i. wt=w*z. Furthermore a combination of addition and multiplication could be performed, f. i. wt=(w+z)*m, "m" being a selectable and optimizable multiplier. The generating module 20 can in any case try out various different transformation formulas so that an even distribution of the identifiers I5, I1, I8, I89 and I16 is brought about on the relevancy table 22.

Figure 8:
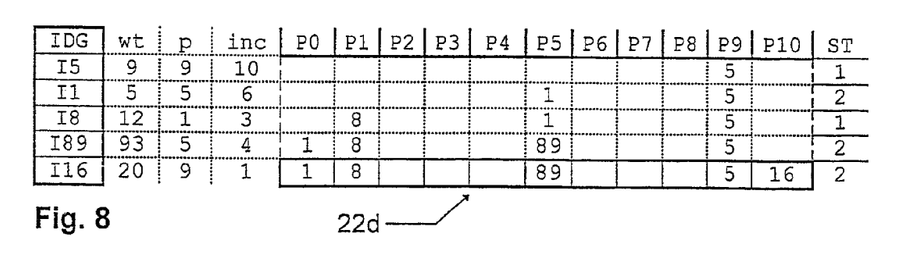

A combination of the optimizing method illustrated in FIGS. 6 and 7 is applied in the relevancy table 22$d$ illustrated in FIG. 8. Here on the one hand the transformation formula (3) with a numerical value (z) of 4 is applied to the identifier values I5, I1, I8, I89 and I16 and on the other hand the association of the identifier I89 is changed, for whose placement in the relevancy table 22$c$ three further working steps were necessary. The identifier I89 is here preferably placed in front of the identifier I1 so that the identifiers I89 and I1 are associated with (i. e. assigned to) the positions P5 and, respectively, P0. The maximum number (smax) will be 2 in the relevancy table 22$d$ as originally aimed at.

It will be clear that the above mentioned optimizing methods may be in principle be employed in any desired order and combination by the generating module 20 so that ultimately an optimum relevancy table for an identifier group is built. The respectively produced relevancy table and the formulas used, the calculating rules (1), the move-on rule (2) and any transformation formula (3) employed therefor are then made available for the respective test module.

It is also possible for a program code of a test module, for example of the test module 15, to already contain the calculating rule (1) the move-on rule (2) and any transformation formula (3) and/or the respective relevancy table in FIG. 1 for example the relevancy table 22$d$. It is an advantage for the generating module 20 to be designed to produce the respective test module or to have ready a producing module, not illustrated, implemented for example by the development tool 17, and/or programming tool, which for example comprises a compiler and a linker, as is marked in FIG. 1 in chained lines at the test module 15 on the development table 17. The test module so produced, for example the test module 15, and/or the respective relevancy table, for example the relevancy table 22$d$, is then made available by the development tool 17 for the respective communication means: in the working example for example the test module 15 is loaded by way of a connection 37 into the communication means 12.

It is also possible for the test module 15 to be employed by the development tool 17 to check over a relevancy table (for example the relevancy table 22$d$) generated by the generating module 20.

The development tool 17, which is more particularly a personal computer or a workstation, and the communication means 11, 12 and 13 are only diagrammatically illustrated in FIG. 1. The respective functional component groups of such means are of the same type from the functional point of view, while being different in their specific structure and more particularly in their performance.

The development tool 17 and the communication means 11, 12 and 13 respectively possess control means 40; memory means 41 and transmission and receiving means 42 connected together by means which are not illustrated. The control means 40 are for example separate processors or processor groups, with which a program coder may be implemented by program modules, which are stored in the memory means 41. The control means 40 of the communication means 11, 12 and 13 implement for example the program code of the test modules 14, 15 and 16 and the control means 40 of the development tool 17 implement the program coder of the generating module 20. In the case of the memory means 41 it is for example a question of hard disks and/or random access memory (RAM) components serving as working memories. In the case of the communication means 11, 12 and 13 the control means 40 are for example constituted by microprocessors.

Further components provided as part of the development tool 17, as for example display means (picture screen or LCD) and input means (keyboard and/or mouse) are omitted to make drawing more straightforward. The communication means 11, 12 and 13 may for instance be a component of a motor vehicle 18, for example a tail lighting unit.

Variations are readily possible in the invention.

To take an example instead of the calculating rule (1) some other calculating rule rendering possible an association of the identifiers I5, I1, I8, I89 and I16 with the relevancy table 22; 22$b$; 22$c$ and 22$d$ could be provided. Furthermore, the move-on rule (2) could be modified or replaced by an alternative move-on rule.

The test modules 14, 15 and 16 could be implemented in the form of hardware, for example ICs of the transmission and receiving means 42.

The respective relevancy tables could constitute a component of the test modules 14, 15 and 16 or respectively be read in by same. For instance, a relevancy table could be loaded in a ROM, which is configured by the development tool 17 for the test module 15.

It is also possible for the generating module 20 to be implemented by the control means 40. For instance, when a message relevant for one of the communication means 11, 12 and 13 is defined and thus a further identifier is relevant for the respective communication means, the generating module 20 could arrange or enter the respective identifier in a relevancy table present in the communication means or in the respective test module, and possibly also perform the above mentioned optimizing of the respective relevancy table 22.

What is claimed is:

1. A test method for the relevancy testing of an identifier, which is able to be transmitted to a communication means by way of a communication network in a message, comprising the steps of:

finding a first position in a relevancy table for the identifier on the basis of a calculating rule applied for the identifier, seeking at least one second position alternative to the first position for the identifier in the relevancy table on the basis of a move-on rule applied to the identifier in the case of conflict where the first position is not available, until an available position, not associated with some other identifier is found in the relevancy table, designation of the identifier as being relevant, if the identifier, or a value associated with it, is entered at the first or the at least one second position, and designation of the identifier as being irrelevant, if at the first position or the at least one second position a non-use marker is entered.

2. The test method as set forth in claim 1, wherein the calculating rule and/or move-on rule for the identifier to be tested are employed for a predetermined number of working steps and wherein the marker is designated as being irrelevant, when the position respectively found after a predetermined maximum number of working steps is associated with a different identifier in the relevancy table to the identifier to be tested.

3. A generating method for building a relevancy table provided for a communication means for relevancy testing of identifiers associated with an identifier group and provided for identifying messages relevant for the communication means and transmitted by way of a communication network, in the case of which positions provided in the relevancy table and not associated with any identifier in the identifier group, are marked with a non-use marker and in the case of which for each identifier of the identifier group performing the following positioning steps comprising:

finding a first position in the relevancy table for the respective identifier using a calculating rule applied to the identifier, seeking at least one second position for the identifier in the relevancy table on the basis of a move-on rule applied to the identifier in the case of conflict, in the case of which the first position is not available, until an available position, not associated with any other identifier in the identifier group is found in the relevancy table, and entry of the identifier or of a value associated with it at the respectively found first or at least one second position.

4. The generating method as set forth in claim 3, wherein for the identifiers of the identifier group a maximum number of working steps is found and made available, such number being maximally necessary during application of the calculating rule and/or the move-on rule to the identifiers of the identifier group so that the maximum number may be employed as a discontinuance criterion during the relevancy testing of an identifier not contained in the identifier group.

5. The generating method as set forth in claim 3, wherein at least one position in the relevancy table is so associated in an optimized manner with an identifier of the identifier group that the number of working steps necessary for finding the position is low.

6. The generating method as set forth in claim 5, wherein the number of the positions able to be associated with identifiers of the identifier group in the relevancy table is increased or reduced and/or wherein the identifiers of the identifier group are transformed to a representation sub-set as part of the application of the calculating rule, on the basis of which representation sub-set positions in the relevancy table are able to be associated with the respective identifiers, the representation sub-set being more particularly so constituted that the positions associated with the respective identifiers are placed evenly and avoiding conflict in the relevancy table and/or wherein a numerical value, which is more particularly set as a random number or numerical series, is added to or subtracted from each identifier of the identifier group and/or wherein the identifiers are respectively multiplied by a multiplier and/or wherein logical operations are performed, such logical operations being more especially logical "AND", logical "OR" or "shift".

7. The generating method as set forth in claim 6, wherein for finding the first or at least one second position in the relevancy table for the identifier a calculating rule is applied influenced by a measurement recited in claim 6 is employed.

8. The generating method as set forth in claim 5, wherein the order, in accordance with which positions are associated with the identifiers of the identifier group in the relevancy table, is varied.

9. The generating method as set forth in claim 5, wherein the at least one identifier positioned in the relevancy table in an optimum manner, is selected in accordance with a predetermined criterion and more especially in accordance with an expected frequency of transmission or in accordance with a priority of the message containing it.

10. The generating method as set forth in claim 3, wherein on application of the calculating rule and/or the move-on rule an indicator is found pointing to the respective first and/or the respective at least one second position, this being performed by dividing the identifier or, respectively, a move-on value derived from same by a prime number, which corresponds to the number of positions provided in the relevancy table for identifiers, such indicator being more particularly found as the whole number remainder of division of the value of the identifiers by the prime number.

11. The generating method as set forth in claim 3, wherein a move-on rule is applied essentially containing the calculating rule.

12. The generating method as set forth in claim 3, wherein the identifier is contained in an address data item, more particularly in a target address, of a respective message or in a content identifier for a content of the respective message.

13. The generating method as set forth in claim 3, wherein as a communication network a broadcast network is utilized and/or wherein as a communication network a bus system and more particularly a CAN bus system or a LIN bus system is employed.

14. The generating method as set forth in claim 3, wherein as a non-use marker a void marker and/or a value associated with an invalid identifier not contained in the identifier group is provided.

15. A test module for relevancy testing of an identifier which is able to be transmitted to a communication means by way of a communication network in a message, comprising test means for the performance of the steps:

finding a first position in the relevancy table for the respective identifier using a calculating rule applied to the identifier, seeking at least one second position alternative to the first position for the identifier in the relevancy table on the basis of a move-on rule applied to the identifier in the case of conflict where the first position is not available, until an available position, not associated with some other identifier is found in the relevancy table, designation of the identifier as being relevant, if the identifier, or a value associated with it, is entered at the first or the at least one second position, and designation of the identifier as being irrelevant, if at the first position or the at least one second position a non-use marker is entered.

16. A generating module for building a relevancy table provided for a communication means for relevancy testing of identifiers associated with an identifier group, such identifiers being provided for identifying messages able to be transmitted by way of a communication network and relevant for the communication means, comprising marking means for marking positions, which are provided in the relevancy table and not associated with any identifier of the identifier group with a non-use marker and positioning means for performing the following positioning steps for each identifier of the identifier group finding a first position in the relevancy table for the respective identifier using a calculating rule applied to the identifier, seeking at least one second position for the identifier in the relevancy table on the basis of a move-on rule applied to the identifier in the case of conflict, in the case of which the first position is not available, until an available position, not associated with any other identifier in the identifier group is found in the relevancy table, and entry of the identifier or of a value associated with it at the respectively found first or at least one second position.

17. A communication means and more particularly a CAN bus participant or a CAN interface component, comprising a test module as set forth in claim 15, wherein more particularly the relevancy table is contained in a non-volatile memory of the communication means and/or comprising a generating module as set forth in claim 16.

18. A motor vehicle and/or a development tool, more particularly in the form of a personal computer, comprising a communication means as set forth in claim and/or comprising a test module as set forth in claim 15 and/or comprising a generating module as set forth in claim 15.

19. The test module as set forth in claim 15 or a generating module as set forth in claim 16, same respectively comprising a program code able to be implemented by a control module of a communication means and/or of a development tool.

20. A storage medium more particularly in the form of a diskette, a CD-ROM, a digital versatile disk, a hard disk unit or the like having stored therein a test module and/or a generating module as set forth in claim 19.

* * * * *